US011436547B2

(12) United States Patent
Shannon et al.

(10) Patent No.: US 11,436,547 B2
(45) Date of Patent: Sep. 6, 2022

(54) WEARABLE DEVICE FOR OPERATIONAL COMPLIANCE

(71) Applicant: BANK OF AMERICA CORPORATION, Charlotte, NC (US)

(72) Inventors: Stephen Thomas Shannon, Charlotte, NC (US); James Alexander, Dripping Springs, TX (US); Scott Thomas Bonomo, Mesa, AZ (US); Joseph Justin Chuba, Cornelius, NC (US); Anthony Pang Fang, Coppell, TX (US); Brian Joseph Smith, Saint Augustine, FL (US); Jacquelin Smith, New Port Richey, FL (US); Kimberly Anne Stittsworth, Decatur, GA (US); Penelope York, Rockland, ME (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/021,854

(22) Filed: Jun. 28, 2018

(65) Prior Publication Data
US 2019/0325365 A1 Oct. 24, 2019

Related U.S. Application Data

(60) Provisional application No. 62/661,559, filed on Apr. 23, 2018.

(51) Int. Cl.
*G06Q 10/06* (2012.01)
*G06Q 10/10* (2012.01)
(Continued)

(52) U.S. Cl.
CPC ... *G06Q 10/0639* (2013.01); *G06Q 10/06398* (2013.01); *G06Q 10/063112* (2013.01);
(Continued)

(58) Field of Classification Search
USPC .......................................................... 705/7.38
See application file for complete search history.

(56) References Cited

U.S. PATENT DOCUMENTS 6,757,719 B1   6/2004 Lightman et al.
7,155,409 B1  12/2006 Stroh
(Continued)

FOREIGN PATENT DOCUMENTS

WO   2013141894 A1   12/2015
WO   2015187882 A1   12/2015
WO   WO-2017087652 A1 *  5/2017 ......... G06Q 10/1091

OTHER PUBLICATIONS

Cyberlock; Cyberlock; Jan. 2018; https://cyberlock.com/wp-content/uploads/2018/01/SE-100.pdf; https://cyberlock.com/wp-content/uploads/2018/01/CyberLock_Catalog_3979.pdf; p. 4, 7, 13.*
(Continued)

*Primary Examiner* — Jerry O'Connor
*Assistant Examiner* — James Webb
(74) *Attorney, Agent, or Firm* — Moore & Van Allen PLLC; Nicholas C. Russell

(57) ABSTRACT

Embodiments of the invention are directed to a system, method, or computer program product for a wearable device coded for user operational compliance. In this way, the invention comprises system integration of a wearable device for user performance and compliance of operational requirements within user obligations. The wearable device logs time of user initiation of obligations for timekeeping and is programmed for gatekeeping for physical and digital access to user authorized locations and data points. The wearable device codes for generating requests for access to non-authorized locations and data points for temporary needs of the user for obligation fulfillment.

20 Claims, 11 Drawing Sheets

(51) Int. Cl.
*H04W 4/02* (2018.01)
*G07C 9/27* (2020.01)
*H04W 12/33* (2021.01)
*H04W 12/63* (2021.01)

(52) U.S. Cl.
CPC ........... *G06Q 10/1095* (2013.01); *G07C 9/27* (2020.01); *H04W 4/023* (2013.01); *H04W 12/33* (2021.01); *H04W 12/63* (2021.01)

(56) References Cited

U.S. PATENT DOCUMENTS

| | | | |
|---|---|---|---|
| 7,605,714 | B2 | 10/2009 | Thompson et al. |
| 7,624,280 | B2 | 11/2009 | Oskari |
| 8,212,653 | B1 | 7/2012 | Goldstein et al. |
| 9,020,848 | B1* | 4/2015 | Ridge ................ G07C 1/10 705/32 |
| 9,300,646 | B1 | 3/2016 | Saylor et al. |
| 9,344,436 | B1* | 5/2016 | Sheng ................ H04L 63/08 |
| 9,542,781 | B2 | 1/2017 | Hatton |
| 9,542,783 | B2 | 1/2017 | Slaby et al. |
| 9,554,274 | B1 | 1/2017 | Castinado et al. |
| 9,600,676 | B1* | 3/2017 | Farmer ............ G06F 21/6254 |
| 9,743,279 | B2 | 8/2017 | Rachur et al. |
| 9,762,581 | B1 | 9/2017 | Wang et al. |
| 9,836,589 | B1 | 12/2017 | Orr et al. |
| 9,892,582 | B2 | 2/2018 | OToole et al. |
| 10,546,108 | B1* | 1/2020 | Eidam ................ H04L 63/0853 |
| 2003/0004783 | A1 | 1/2003 | Calderaro et al. |
| 2013/0179494 | A1 | 7/2013 | Chakravarthy et al. |
| 2013/0254304 | A1 | 9/2013 | Van Nest et al. |
| 2013/0290154 | A1* | 10/2013 | Cherry ................ G07C 1/10 705/32 |
| 2014/0122188 | A1 | 5/2014 | Van Pelt et al. |
| 2015/0123767 | A1 | 5/2015 | Tolle |
| 2015/0206106 | A1 | 7/2015 | Yago |
| 2015/0222604 | A1 | 8/2015 | Ylonen |
| 2015/0288666 | A1 | 10/2015 | Rao et al. |
| 2016/0012384 | A1* | 1/2016 | Hanson ........... G06Q 10/063118 705/7.17 |
| 2016/0012410 | A1 | 1/2016 | Hanson et al. |
| 2016/0034696 | A1 | 2/2016 | Jooste et al. |
| 2016/0112871 | A1* | 4/2016 | White .................. H04W 12/06 726/4 |
| 2017/0010665 | A1 | 1/2017 | Tanaka et al. |
| 2017/0048251 | A1 | 2/2017 | Guday et al. |
| 2017/0061405 | A1 | 3/2017 | Bryant |
| 2017/0195322 | A1 | 7/2017 | Cho et al. |
| 2017/0372592 | A1 | 12/2017 | Neravati et al. |
| 2018/0005469 | A1 | 1/2018 | Campbell et al. |
| 2018/0039769 | A1 | 2/2018 | Saunders et al. |
| 2018/0060926 | A1 | 3/2018 | Guadagno |
| 2018/0082051 | A1 | 3/2018 | Gibbs et al. |
| 2018/0115897 | A1 | 4/2018 | Einberg et al. |
| 2018/0211718 | A1 | 7/2018 | Heath |
| 2018/0218176 | A1 | 8/2018 | Voorhees et al. |
| 2018/0248880 | A1 | 8/2018 | Sardesai et al. |
| 2019/0057382 | A1 | 2/2019 | Wright et al. |
| 2019/0082312 | A1* | 3/2019 | Neybert ............ G06Q 50/265 |
| 2019/0087892 | A1 | 3/2019 | Pinski et al. |

OTHER PUBLICATIONS

Cyberlock; Cyberlock; Jan. 2018; https://cyberlock.com/wp-content/uploads/2018/01/SE-100.pdf; https://cyberlock.com/wp-content/uploads/2018/01/CyberLock_Catalog_3979.pdf; p. 4, 7, 13, 21.*
Bhatt, An Access Control Framework for Cloud-Enabled Wearable Internet of Things, Oct. 17, 2017, https://ieeexplore.ieee.org/stamp/stamp.jsp?tp=&amumber=8181511, p. 1-11.

* cited by examiner

WEARABLE DEVICE FOR OPERATIONAL COMPLIANCE

CROSS-REFERENCE TO RELATED APPLICATION

This application is a non-provisional filing of U.S. Patent Application No. 62/661,559 filed Apr. 23, 2018, entitled "Wearable Device Coding for Entity Processing," the contents of which are hereby incorporated by reference.

BACKGROUND

Currently associates of entities document locations, appointments, regulatory compliance, and hours via electronic or paper logs. These logs are not instantaneous nor illustrate real-time changes in a fluid entity environment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for a wearable device coded for entity processing. In this way, the invention comprises system integration and locking of a wearable device for user and location based operations and access of entity processing via a wearable device. Upon authentication for user and location, the wearable device may be manipulated for operational compliance, regulatory compliance, customer consent, and employment obligation integration and functionality.

The system allows for integration of a wearable device into entity processing. As such, each user or associate at an entity may receive an integrated wearable device. The wearable device authenticates the user and confirms the user is wearing the device. The wearable device may identify when the user enters an entity locations and/or begins employment obligations. The wearable device triggers timekeeping for the user so that the user does not have to clock in or clock out. Upon gaining access to a location associated with the entity, the wearable device deploys entity information to the wearable device specific for the user. The wearable device may also identify a user security level and act as a badge, passcode, password or the like to allow access to various locations (physical and digital) based on an authorization of access communicated via the wearable device. If the user is not authorized to gain access to a location, the wearable device may transmit a request to access to a manager or administrator. The request may also include either user or device input as to why the user is making the request. For example, the wearable device may provide an indication that the user has a scheduled meeting at the location and needs temporary access to the location for the meeting. Furthermore, the system may monitor locations of user's base on their wearable device. In this way, upon any danger or natural disaster, the entity may quickly be able to identify the location of the users and if any of the users need assistance.

Embodiments of the invention comprise systems, methods, and computer program products for wearable device coding for operational compliance, the invention comprising: deploying a wearable device to one or more users associated with an entity; identifying initiation of performance of employment obligation by the user based on wearable device location and log user time for performance of employment obligation; determining a level of authorization of the user wearing the wearable device for controlling access to entity physical and/or electronic locations and code the wearable device for access; receiving request from the wearable device to access an entity location; denying user access to entity location based on level of authorization; transmitting denial of user access to administrator wearable device, where the transmission includes user input via an interactive interface on the wearable device with reasons for request for access to the entity location; and coding, based on administrator approval via administrator wearable device, real-time limited access to the entity location for the user In some embodiments, the invention further comprises authenticating the user to gain access to one or more entity physical and/or electronic locations based on the wearable device coding.

In some embodiments, determining the level of authorization of the user wearing the wearable device, further comprises identifying the user employment obligations within the entity and authorizing the user to gain access to entity locations and data for completion of the employment obligation.

In some embodiments, the invention further comprises triggering monitoring a location of the user via the wearable device based on danger or natural disaster for identification of user and transmission of assistance to user.

In some embodiments, the wearable device is a passcode device accepted at a point of entry to a location that allows user access to the entity location based on level of authorization of the user.

In some embodiments, identifying initiation of performance of employment obligation based on wearable device location and log user time for employment obligations further comprises identifying a duration of performance of the employment obligation and logging the entire duration of performance for user timekeeping.

In some embodiments, the invention further comprises displaying entity information on the wearable device, wherein the information displayed or accessible to the user via the wearable device is based on a level of authorization the user has within the entity.

In some embodiments, deploying the wearable device to one or more users further comprises deploying an electronic watch with an interactive interface for communication with other wearable devices across the entity, wherein the user is an associate engaged in obligations for the entity.

In some embodiments, the invention further comprises blocking access to entity data on the wearable device upon identification of geolocation of wearable device off location from entity designated locations.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
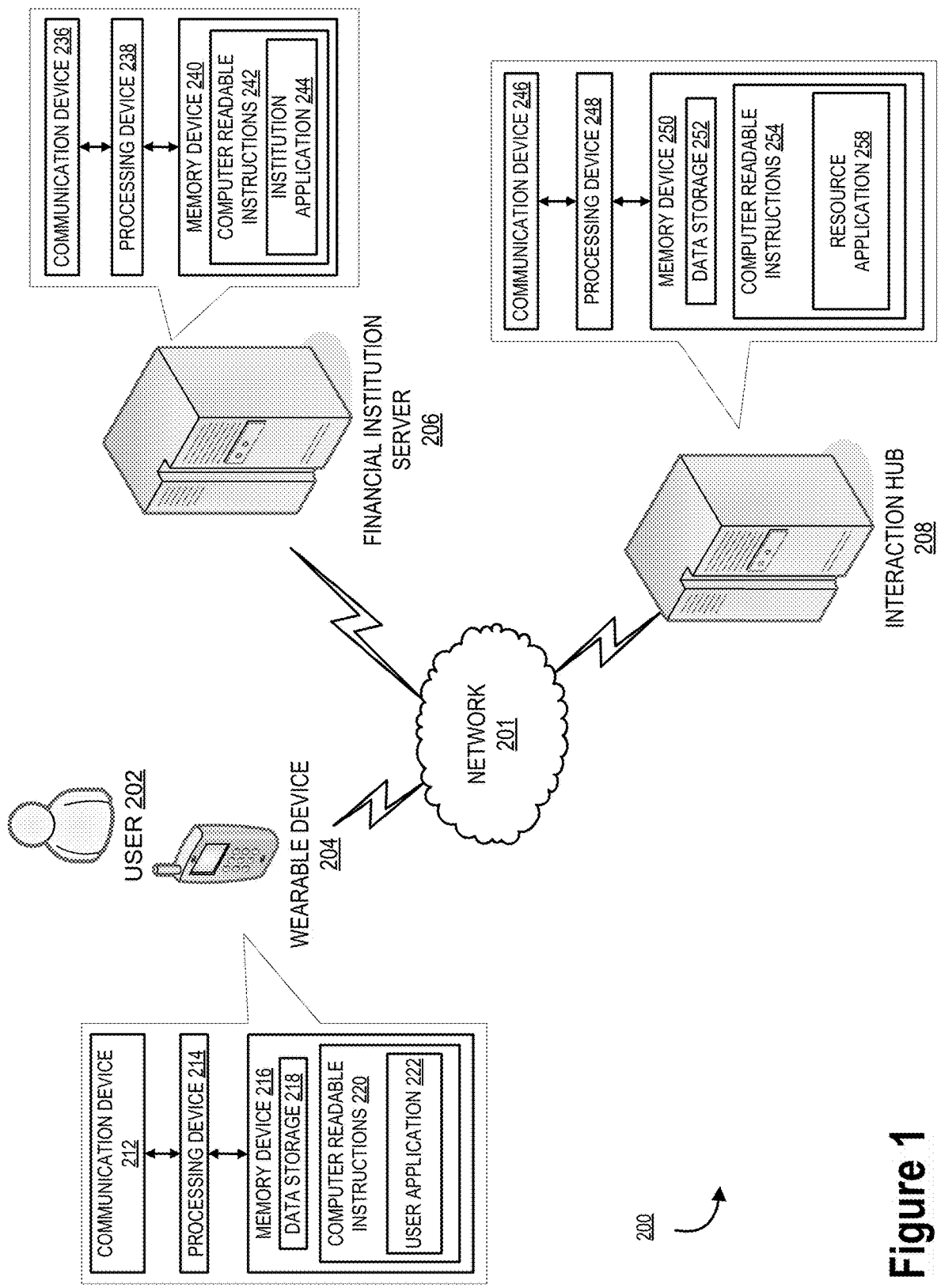
Figure 2:
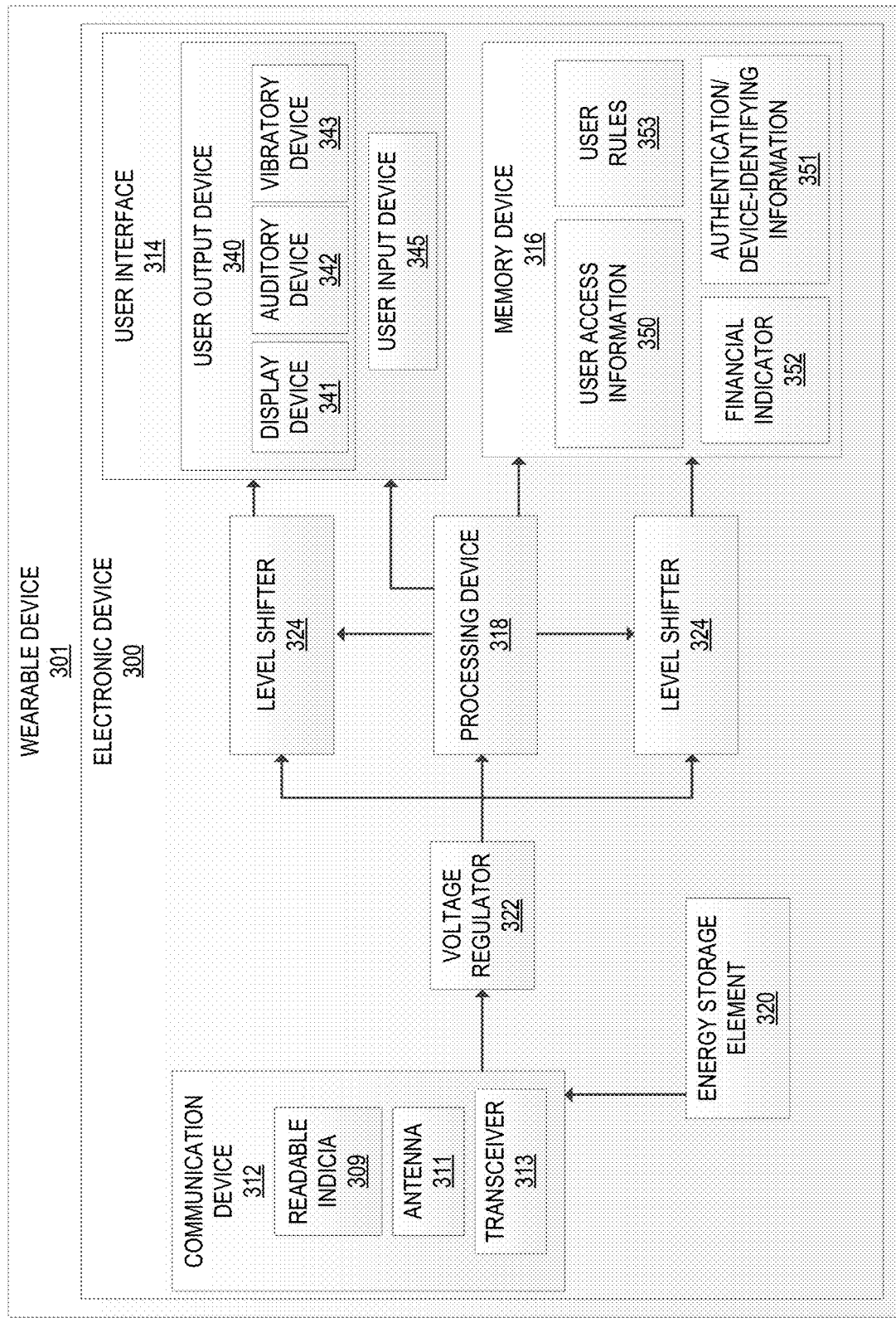
Figure 3:
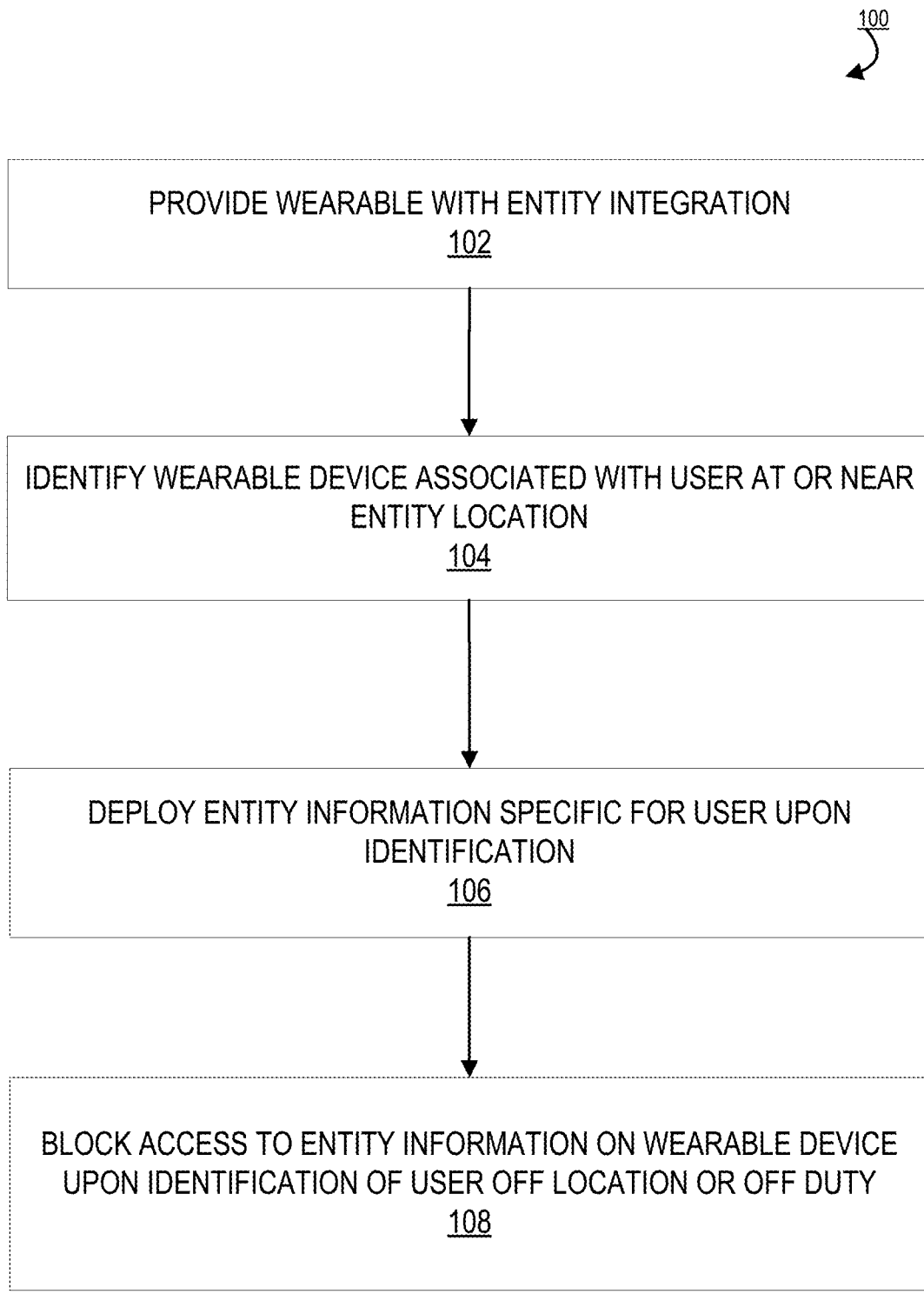
Figure 4:
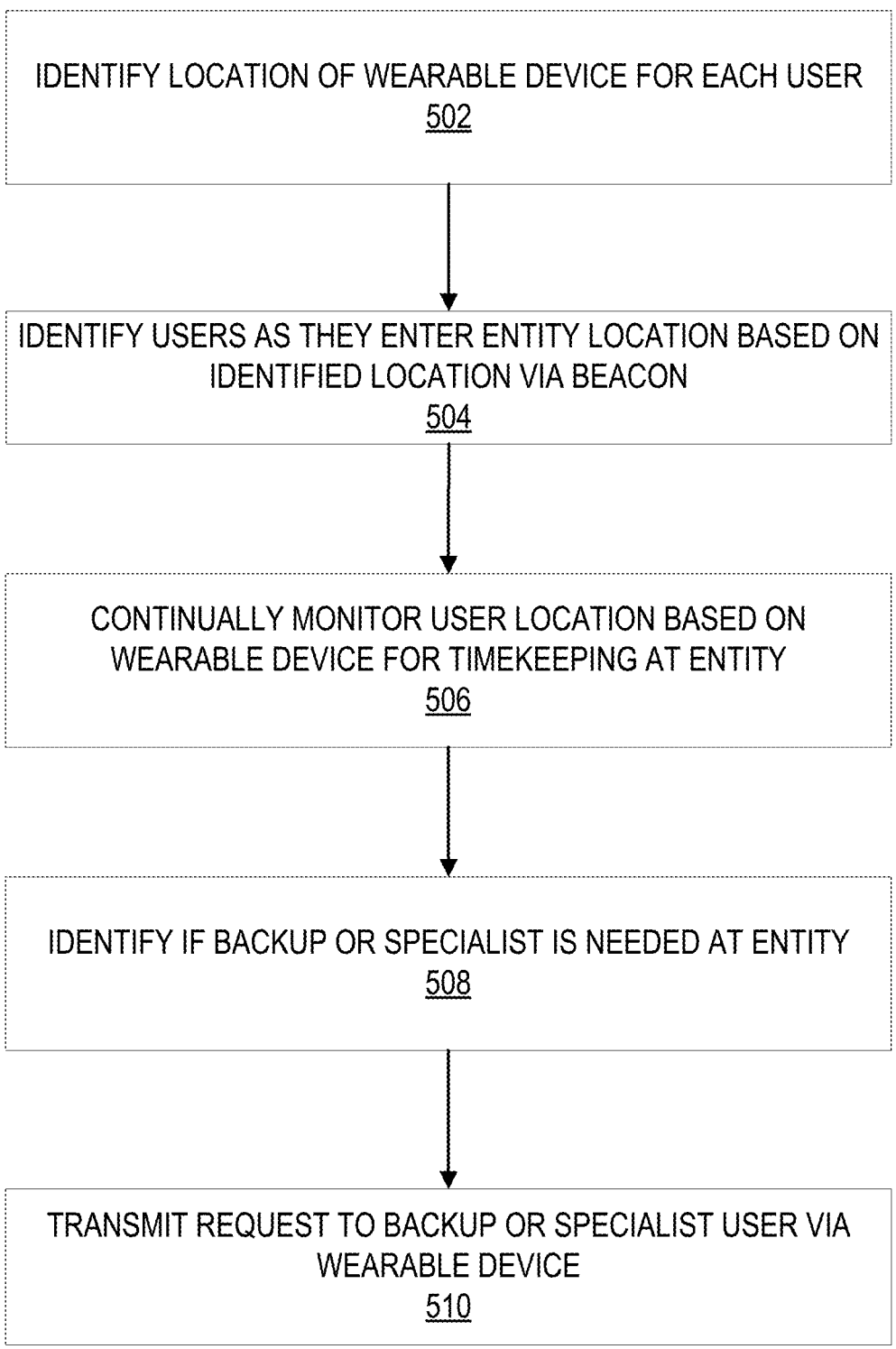
Figure 5:
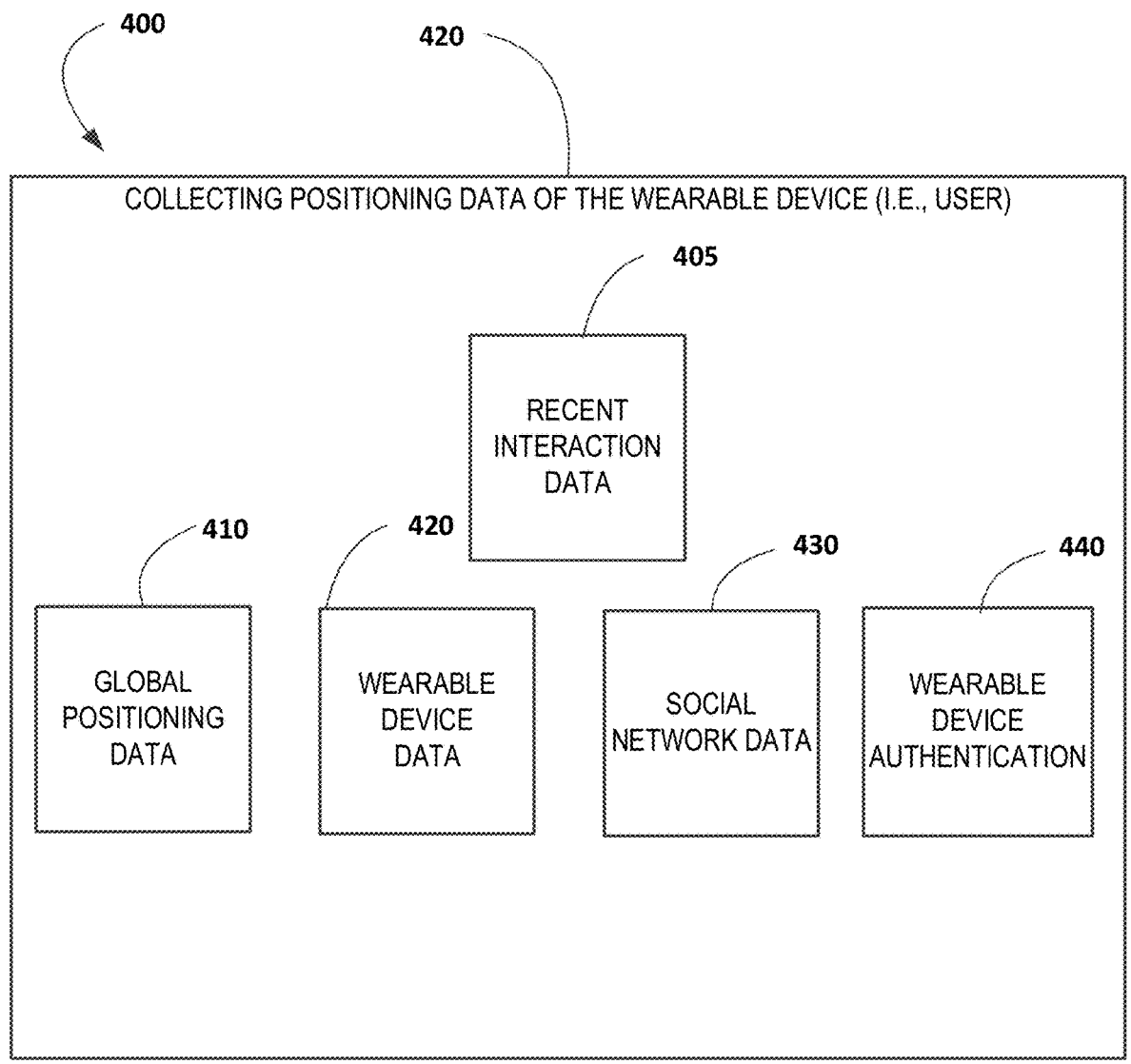
Figure 6:
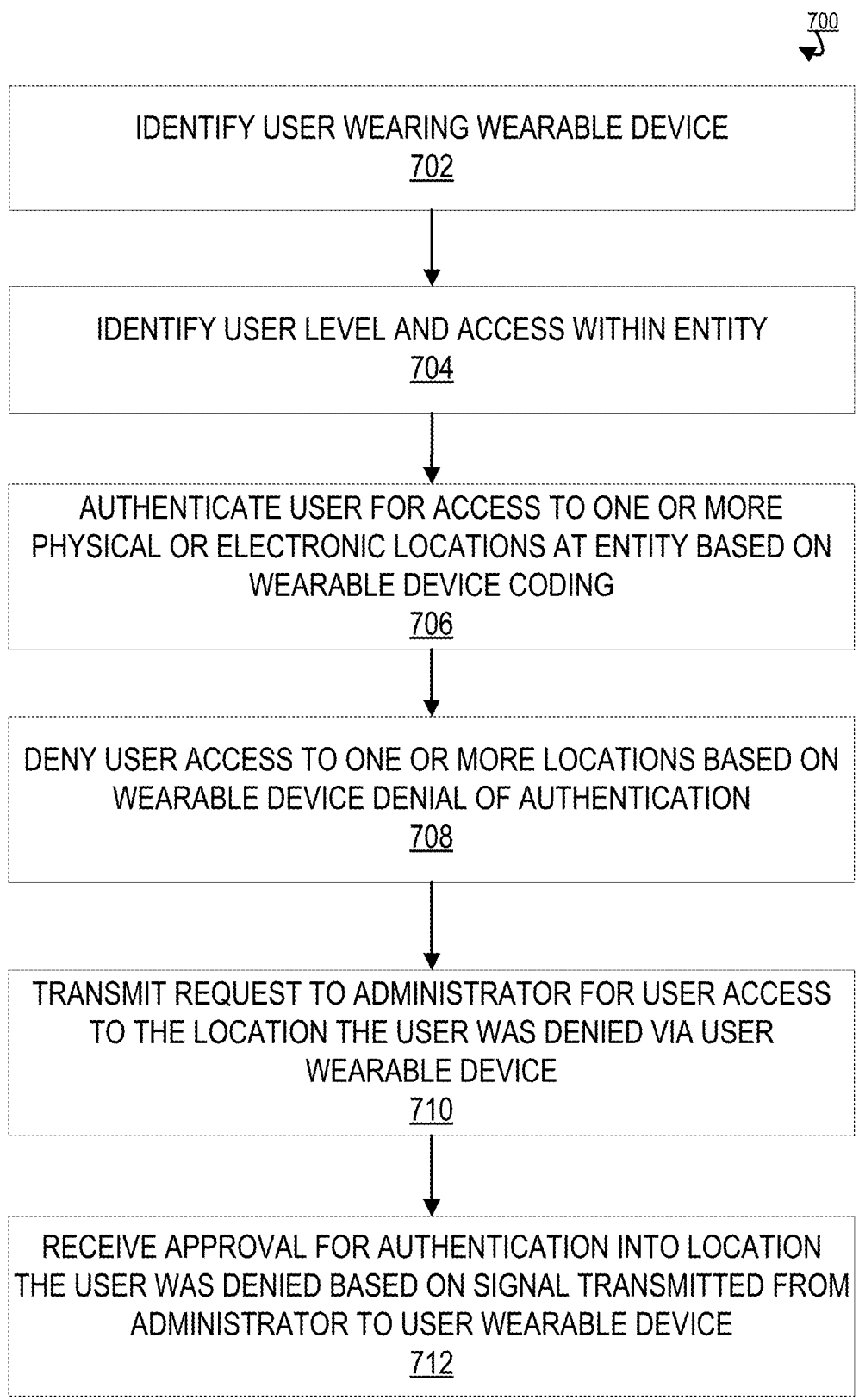
Figure 7:
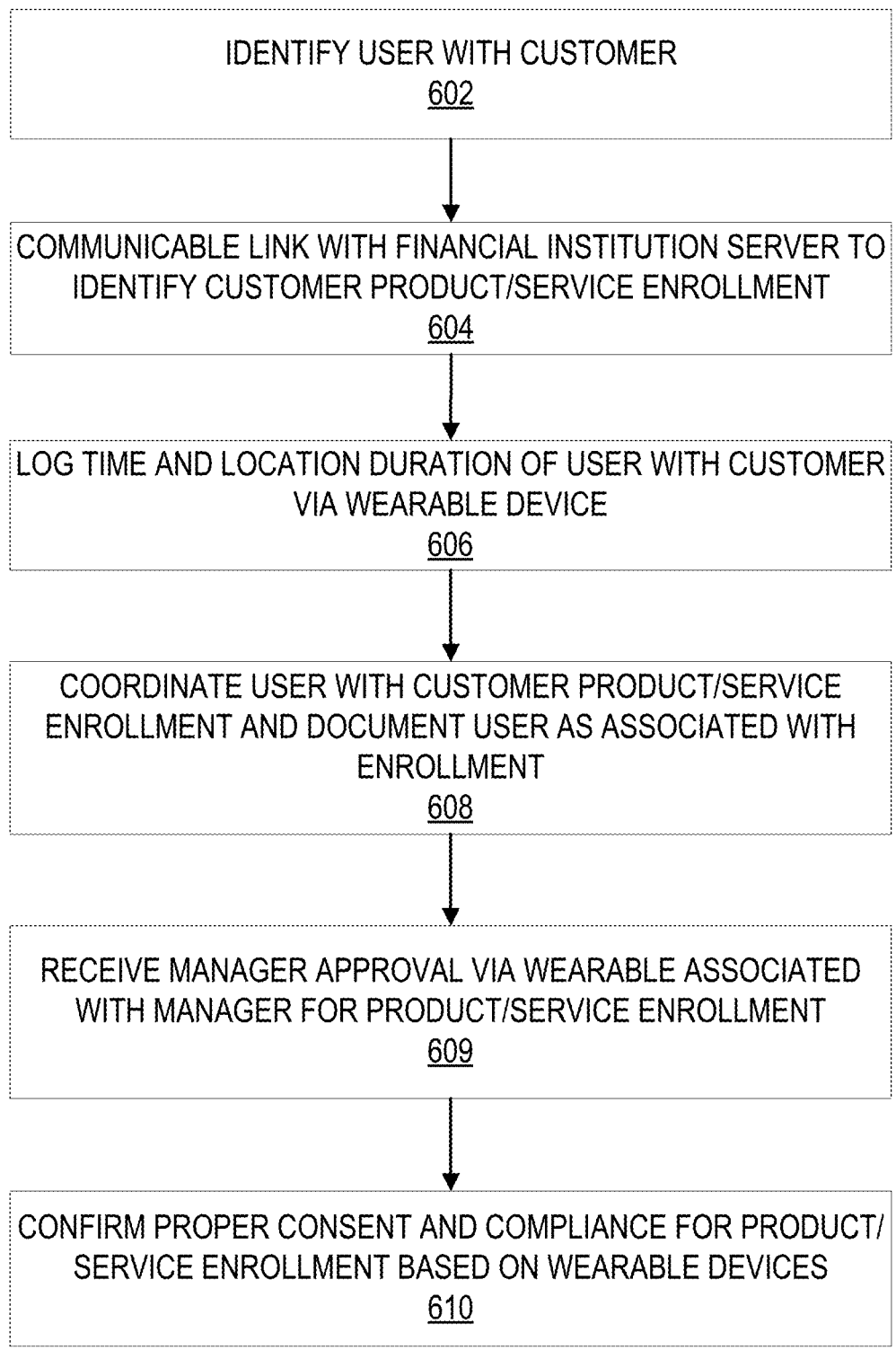
Figure 8:
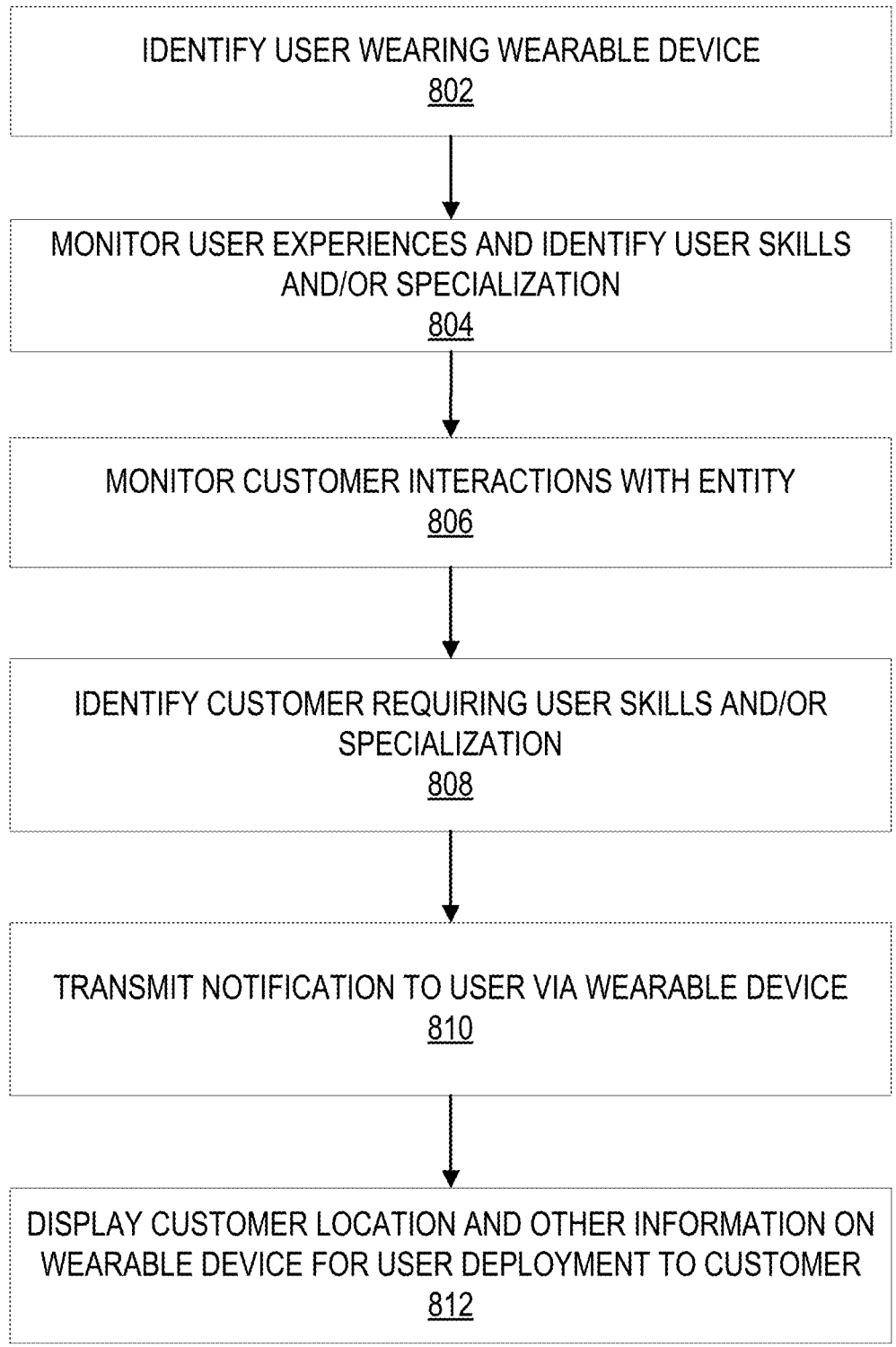
Figure 9:
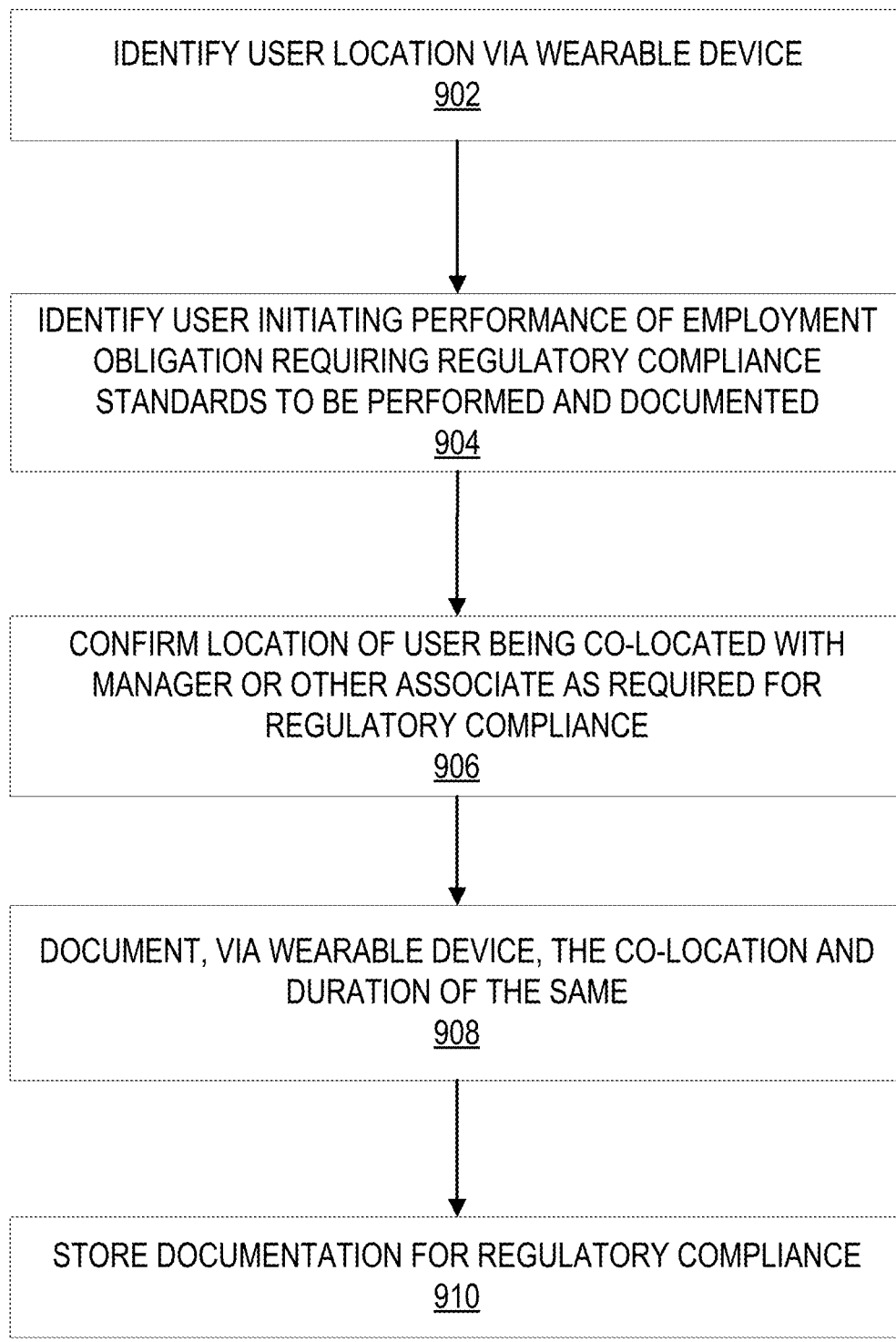
Figure 10:
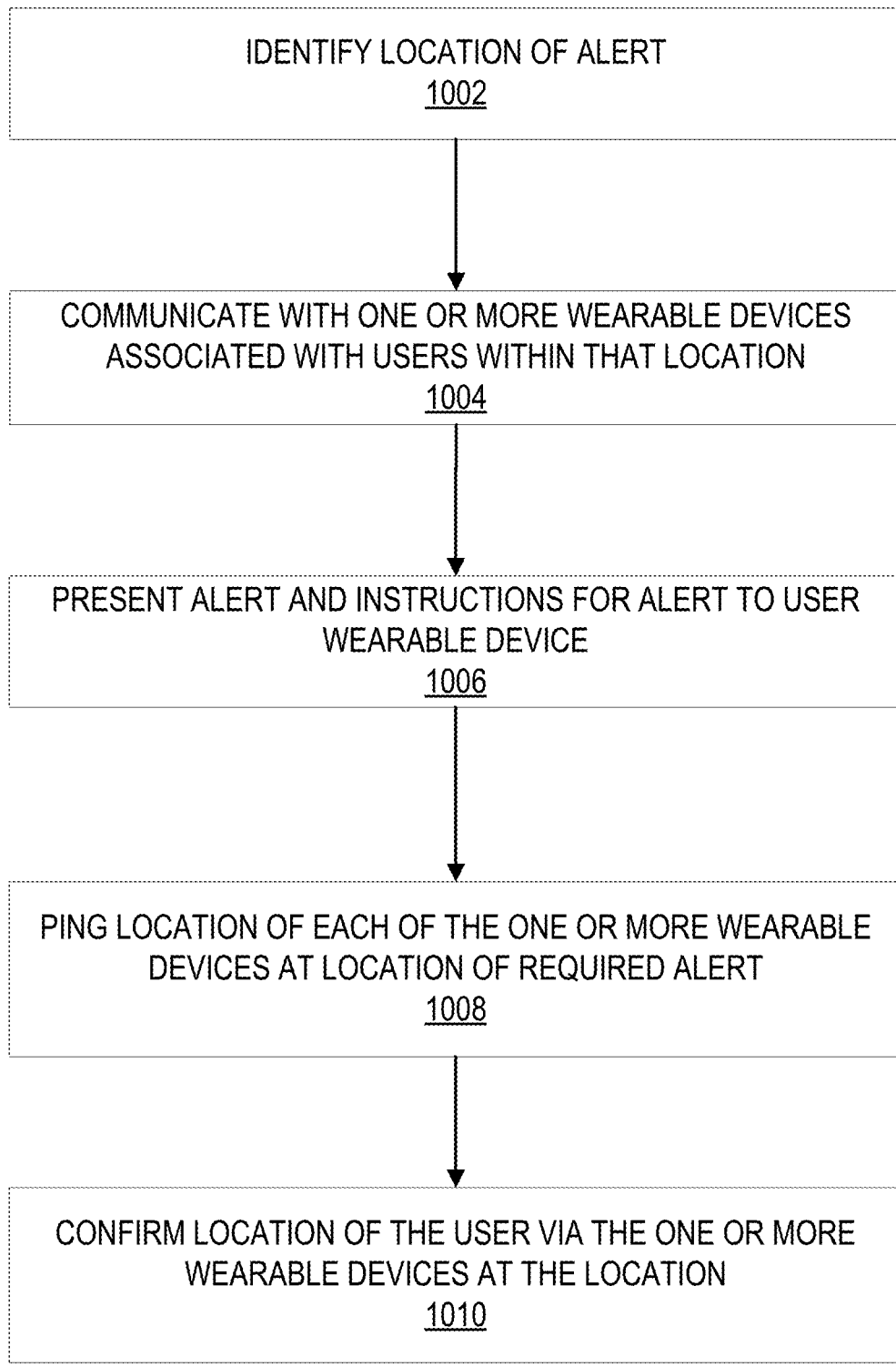
Figure 11:
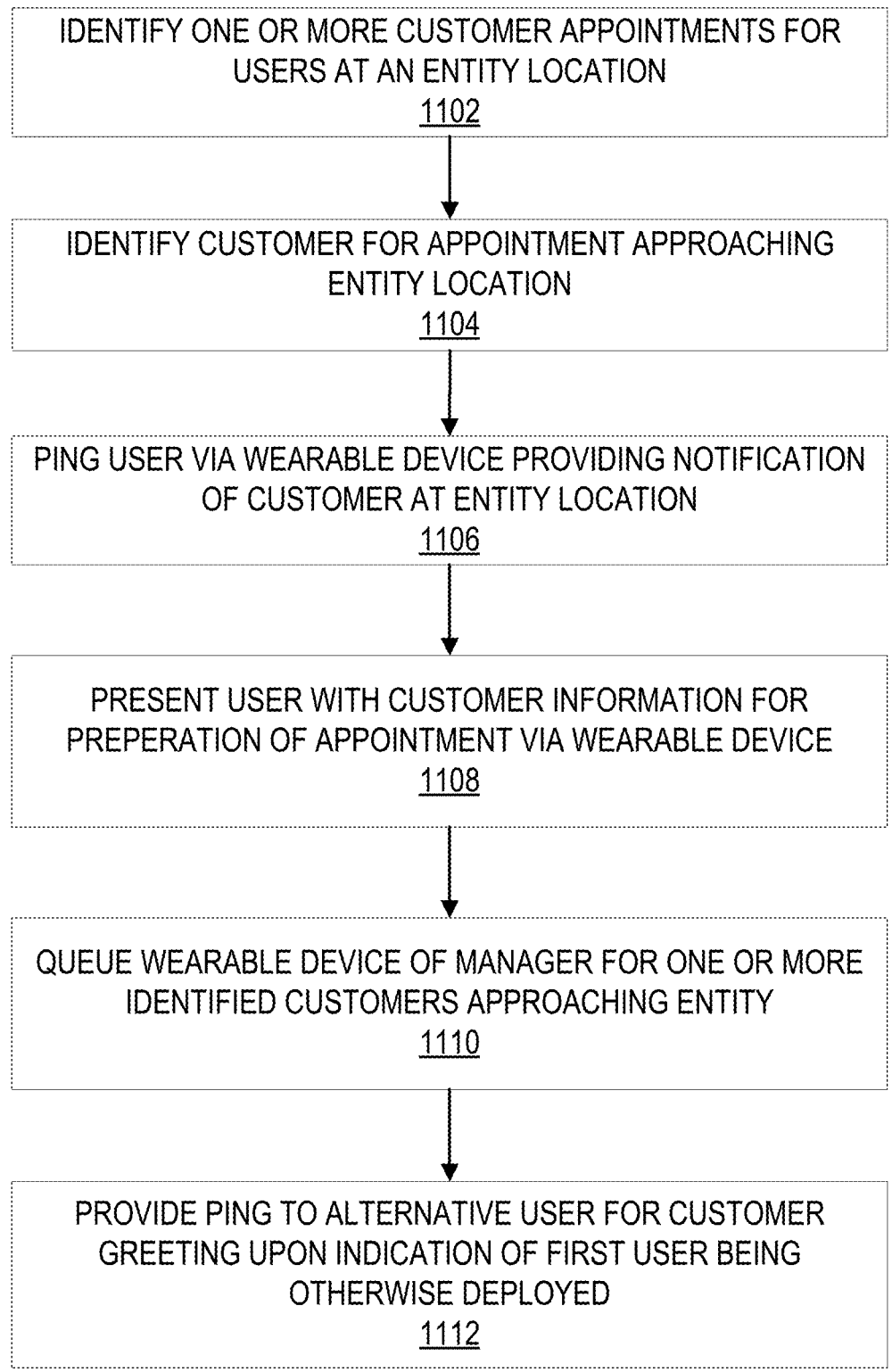

Having thus described embodiments of the invention in general terms, reference will now be made to the accompanying drawings, wherein:

FIG. 1 provides entity processing with wearable device integration system environment, in accordance with one embodiment of the present invention;

FIG. 2 provides a system diagram for a wearable device, in accordance with one embodiment of the present invention;

FIG. 3 provides a high level process flow illustrating wearable device user and entity integration, in accordance with one embodiment of the present invention;

FIG. 4 provides a high level process flow illustrating operational management via wearable device within an entity, in accordance with one embodiment of the present invention;

FIG. 5 provides a process map illustrating position data gathering via wearable device, in accordance with one embodiment of the present invention;

FIG. 6 provides a process map illustrating authorization access to one or more locations within entity via wearable device, in accordance with one embodiment of the present invention;

FIG. 7 provides a process map illustrating consent and compliance via wearable device, in accordance with one embodiment of the present invention;

FIG. 8 provides a process map illustrating identification of user skill set and deployment of skills via wearable device directive, in accordance with one embodiment of the present invention;

FIG. 9 provides a process map illustrating regulatory compliance mapping via wearable device, in accordance with one embodiment of the present invention;

FIG. 10 provides a process map illustrating providing internal alerts via a wearable device, in accordance with one embodiment of the present invention; and FIG. 11 provides a process map illustrating performing real-time appointment generation and modification via a wearable device, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A wearable device as used herein may refer to and is configured to be worn on the body. In some embodiments, the wearable device is a watch. The wearable device is configured for wearing on various body such as the wrist or ankle or the like. In other embodiments, the wearable device is or includes a charm wearable on a chain around the neck, ankle or wrist or is or includes a necklace. In other embodiments, the wearable device is or includes one or more rings, a wristwatch or incorporated into eyeglass rims, eyeglasses, such as embedded in and/or on eyeglass lenses, contact lenses, shoes, purse, wallet, a cap, a hat, a visor, a shoelace, a button, a belt, a belt buckle, an implant, or some other clothing accessory or personal accessory worn or carried on a user's person.

Resources, as used herein may include locations, data, or other information that a user may have access to within an entity. The resources may be associated with accounts, entity data, entity locations, or the like. A user may be associated with an entity and perform various functions for the entity, such as be an employee, associate, work-for-hire, contractor, visitor, or otherwise affiliated with the entity. An entity may be any business, corporation, financial institution, or the having one or more users.

The system allows for integration of a wearable device into entity processing. As such, each user or associate at an entity may receive an integrated wearable device. The wearable device authenticates the user and confirms the user is wearing the device. The wearable device may identify when the user enters an entity locations and/or begins employment obligations. The wearable device triggers timekeeping for the user so that the user does not have to clock in or clock out. Upon gaining access to a location associated with the entity, the wearable device deploys entity information to the wearable device specific for the user. The wearable device may also identify a user security level and act as a badge, passcode, password or the like to allow access to various locations (physical and digital) based on an authorization of access communicated via the wearable device. If the user is not authorized to gain access to a location, the wearable device may transmit a request to access to a manager or administrator. The request may also include either user or device input as to why the user is making the request. For example, the wearable device may provide an indication that the user has a scheduled meeting at the location and needs temporary access to the location for the meeting. Furthermore, the system may monitor locations of user's base on their wearable device. In this way, upon any danger or natural disaster, the entity may quickly be able to identify the location of the users and if any of the users need assistance.

FIG. 1 illustrates an entity processing with wearable device integration system environment 200, in accordance with one embodiment of the present invention. FIG. 1 provides the system environment 200 for which the distributive network system with specialized data feeds for wearable device integration into user employment.

As illustrated in FIG. 1, the interaction hub 208 is operatively coupled, via a network 201 to the wearable device 204 and the financial institution server 206. In this way, the interaction hub 208 can send information to and receive information from the wearable device 204 and the financial institution server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has a wearable device 204. FIG. 1 also illustrates a wearable device 204. The wearable device 204 may be configured to be worn on the body. In some embodiments, the wearable device 204 is a watch. The wearable device 204 is configured for wearing on various body such as the wrist or ankle or the like. In other embodiments, the wearable device 204 is or includes a charm wearable on a chain around the neck, ankle or wrist or is or includes a necklace. In other embodiments, the wearable device is or includes one or more rings, a wristwatch or incorporated into eyeglass rims, eyeglasses, such as embedded in and/or on eyeglass lenses, contact lenses, shoes, purse, wallet, a cap, a hat, a visor, a shoelace, a button, a belt, a belt buckle, an implant, or some other clothing accessory or personal accessory worn or carried on a user's person. The wearable device 204 is further illustrated below in FIG. 3, but generally comprises a communication device 212, a processing device 214, and a memory device 216. The wearable device 204 is a computing system that is associated with the user 202 and/or worn by the user 202 and is linked to the interaction hub 208 or entity in order to monitor position, regulatory compliance, operational compliance, appointments, and the like of the user 202. The processing device 214 is operatively coupled to the communication device 212 and the memory device 216. The processing device 214 uses the communication device 212 to communicate with the network 201 and other devices on the network 201, such as, but not limited to the financial institution server 206 and the interaction hub 208. As such, the communication device 212 generally comprises a modem, server, or other device for communicating with other devices on the network 201.

The wearable device 204 comprises computer-readable instructions 220 and data storage 218 stored in the memory device 216, which in one embodiment includes the computer-readable instructions 220 of a user application 222.

In some embodiments, the user application 222 allows a user 202 to provide authentication, operational compliance, regulatory compliance, customer consent, and employment obligations for the user 202.

As further illustrated in FIG. 1, the interaction hub 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server 206 and the wearable device 204. As such, the communication device 246 generally comprises a modem, server, or other device for communicating with other devices on the network 201.

As further illustrated in FIG. 1, the interaction hub 208 comprises computer-readable instructions 254 stored in the memory device 250, which in one embodiment includes the computer-readable instructions 254 of a resource application 258. In some embodiments, the memory device 250 includes data storage 252 for storing data related to the system environment, but not limited to data created and/or used by the resource application 258.

As illustrated in FIG. 1, the financial institution server 206 is connected to the interaction hub 208 and wearable device 204 and is associated with a financial institution network. In this way, while only one financial institution server 206 is illustrated in FIG. 1, it is understood that multiple network systems may make up the system environment 200. The financial institution server 206 generally comprises a communication device 236, a processing device 238, and a memory device 240. The financial institution server 206 comprises computer-readable instructions 242 stored in the memory device 240, which in one embodiment includes the computer-readable instructions 242 of an institution application 244. The financial institution server 206 may communicate with the interaction hub 208 and the wearable device 204 for user 202 and customer obligation and compliance.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a system diagram for a wearable device, in accordance with one embodiment of the present invention. The wearable device 301 generally includes an electronic device 300 portion that is configured to perform the communication and/or logic portions of the wearable device 301. The electronic device 300 may be, in whole or in part, coupled to, embedded in, placed in, and/or formed integrally with the other portions of the wearable device 301. The electronic device 300 includes, in various embodiments, a communication device 312, a user interface 314 for communication, and a memory device 316 for storing data and/or computer-executable program code. In various embodiments, the electronic device 300 includes a processing device 318, energy storage elements 320, a voltage regulator 322, and one or more level shifters 324. In some embodiments, the communication device 312 includes an antenna 311 and in some it includes a transceiver 313, wherein one or both of the antenna 311 and/or transceiver 313 are configured for short and/or long range communication. The communication device also includes readable indicia 309, which include but are not limited to a scanable code, a quick response (QR) code, image-readable code, a bar code, an image, picture, icon, or text, or the like, that is integrated with the electronic device 300 and its associated. The readable indicia 309 may be electronic or electronically produced via a user interface 314 (or more specifically a user output device 340 which includes a display device 342). In other embodiments, the readable indicia 309 is printed onto the wearable device 301 or is printed onto a sticker adhesive that is coupled to the wearable device 301. In some embodiments, the user interface 314 includes a user output device 340 having one or more of a display device 341, an auditory device 342, a vibratory device 343, some other output device or the like. In some embodiments, the user interface 314 includes a user input device 345 for receiving user input. In some embodiments, the memory device is configured to store computer-readable or computer-executable instructions and/or code. In the embodiment shown, the memory device 316 includes user access information 350, user rules 353, financial indicator 352 and an authentication/device-identifying information 351. The user access information 350, in various embodiments, includes one or more locations, physical or digital, that the user may have access to based on his/her level of authorization. In this way, the system may identify the level of the user within the entity and identify the locations that the user may gain access to one or more physical and/or digital areas for The user rules 353 include instructions for the user including the skills of the user, appointments for the user, access for the user, and the like. The financial indicator 352 includes instructions for indication of the user for communication with the customer, appointments, or the like.

The authentication/device-identifying information 351 includes data and/or instructions regarding authenticating the user with another system or another wearable device. In other embodiments, the information 350 includes device-identifying information 351, such as, for example, an identifier identifying the wearable device 301. For example, in one embodiment, each wearable device 301 and/or each electronic device 300 is associated with an identification number used in communication with one or more other systems. In various embodiments, the wearable device 301 may or may not include some or all of the components and instructions/code shown in the example embodiment of FIG. 2. For example, in some embodiments, the wearable device 301 may or may not include a display. In other embodiments, for example, the wearable device 301 is watch or wearable electronic device. In various other embodiments, numerous combinations of the discussed components and/or instructions are included.

In some embodiments of the wearable device 301, the communication device 312 of the electronic device 300 is configured for receiving an external signal from a field (not shown), typically initiated at an external system. An external power source environment may include a field that, in various embodiments, is an electro-magnetic (EM) field, a radio frequency (RF) field, some other wireless communication field, or the like. The communication device 312 is also configured for converting the electro-magnetic signal to electrical power (i.e., an electrical signal) for powering the electronic device 300. A processing device 318 may be coupled (directly or indirectly) with the electrical signal of the communication device 312. The processing device 318 may generate one or more data signals, a portion of the data signals may be coupled with the user interface 314, and another (or the same) portion of the data signals may be coupled with the memory device 316. For example, the user interface 314, in one embodiment, receives power (directly or indirectly) from or derived from the electrical signal from the communication device 312. The memory device 316, in some embodiments, receives power (directly or indirectly) from or derived from the electrical signal from the communication device 312. Responsive to the signal from the field received by the electronic device 300, in some embodiments, data can be presented by the user interface 314, and the data stored by the memory device 316 can be changed.

In one example, the output of the communication device 312 is a voltage signal, such as a DC voltage, which may include but is not limited to a low voltage such as, for example, approximately 1.25 volts. In some embodiments, for example, the electronic device 300 includes a voltage regulator 322. The voltage regulator 322 is coupled with output of the communication device 312. The voltage regulator provides a stable or regulated output voltage for use by other components within the electronic device 300. For example, the voltage regulator 322, in one embodiment, includes circuit elements such as diodes, resistors, and/or capacitors for stabilizing the output signal received from the communication device 312. The voltage regulator 322, in some embodiments, is also configured for providing a regulating voltage to the other components within the electronic device 300. The voltage regulator 322, in some embodiments, includes other circuits and/or components configured for providing a regulated voltage and/or configured for stabilizing the voltage on the output of the voltage regulator 322.

The electronic device 300 includes or is coupled with one or more energy storage elements 320, also referred to as energy storage circuits, in some circumstances. The energy storage elements 320, in some embodiments, are coupled with the output of the communication device 312. In one embodiment, for example, the energy storage element 320 couples with the communication device output in order to store energy received from the communication device 312 and provide the energy to the input of the voltage regulator 322. Alternatively or additionally in various embodiments, energy storage elements 320 are coupled with the output of the voltage regulator 322 so as to store energy and provide energy to the components downstream of the voltage regulator 322 within the electronic device 300. The energy storage elements 320, in some embodiments, include capacitors, inductors, or other energy storage elements or circuits configured for providing energy storage.

In some embodiments, for example, one or more level shifters 324, also referred to as voltage conversion circuits or voltage translator circuits, are configured to provide or create the voltage levels utilized by the user interface 314 and/or by the memory device 316. In an alternative embodiment, a voltage regulator 322 is configured to provide multiple output voltage signals 332. In such an embodiment, each output voltage signal is a different voltage level in order to supply various voltage levels as required by multiple components of the electronic device 300, such as, for example, the processing device 318, the user interface 314, and/or the memory device 316 and/or other components. In some embodiments, the one or more level shifters 324 use other circuits and/or mechanisms configured for shifting a voltage signal.

In some embodiments, the communication device 312 receives a signal from the field generated by a communication device. In some embodiments, the signal from the field is converted into electric power having varying characteristics configured such that it can be utilized by the circuit components of the electronic device 300. The processing device 318 is activated by the electric power received from the field in some embodiments.

Referring again to the embodiment shown in FIG. 2, the processing device 318 is powered, for example, based on the energy received from an external source initiating the field. The processing device 318, in various embodiments, has one or more outputs. In one embodiment, for example, one or more outputs are coupled to the user interface 314 and provide control signals from the processing device 318 to the user interface 314. In some embodiments, the outputs include data signals and control signals, and in other embodiments, the outputs include only one or the other. In some embodiments, the outputs include control signals configured for controlling the memory device 316. The processing device 318, in some embodiments, includes other outputs which can be utilized to activate or de-activate other circuit elements within the electronic device 300, such as to selectively enable or selectively disable circuit sections of the electronic device 300 in order to conserve energy or efficiently utilize energy. The processing device 318 in various embodiments is compliant with the publicly available standards and/or specifications.

The user interface 314, in various embodiments, is collocated with the electronic device 300 on the wearable device 301, and in other embodiments, the user interface 314 is coupled with the electronic device 300 but is located separate from the electronic device 300 on or in the wearable device 301. In some embodiments, the display device 341 of the user interface 314 is or includes a persistent display which, once written, will display the desired data and will persistently maintain the display of that data until the display is re-written or otherwise changed. The display device 341, in some embodiments, is a fixed segment display, a dot matrix display, a positive or negative reflective display which can be read by the user or cardholder using ambient light, a liquid crystal display, or other display. In other embodiments, the display device 341 is a single indicator such as a light emitting diode (LED). In some embodiments, the display device 341 includes one or more indicators configured to provide different colors intended to communicate different messages to the customer. In some embodiments, the wearable device 301 is configured for communicating information. In some such embodiments, the display device 341 includes one or more indicators configured for multiple color light, text, image, and the like emission. In various other embodiments, the wearable device 301 includes one or more additional indicator devices such as auditory devices 342, for example speakers and the like, and/or vibratory devices 343.

In various embodiments of the wearable device 301, the wearable device 301 is configured for wearing on various body such as the wrist or ankle or the like. In some embodiments, the wearable device 301 is or includes a charm wearable on a chain around the neck, ankle or wrist or is or includes a necklace. In other embodiments, the wearable device 301 is or includes one or more rings, a wristwatch or incorporated into a wristwatch, eyeglass rims, eyeglasses, such as embedded in and/or on eyeglass lenses, contact lenses, shoes, purse, wallet, a cap, a hat, a visor, a shoelace, a button, a belt, a belt buckle, an implant, or some other clothing accessory or personal accessory worn or carried on a user's person.

FIG. 3 provides a high level process flow illustrating wearable device user and entity integration 100, in accordance with one embodiment of the present invention. As illustrated in block 102, the process 100 is initiated by providing wearable device with entity integration for the user within the entity. The wearable device may be a watch or the like that the user, that is an associate or otherwise engaged in employment or other obligations with the entity, may be wearing during employment or off hours.

Next, as illustrated in block 104, the process 100 continues by identifying a wearable device associated with a user at or near an entity location. In this way, the system may trigger access to entity data based on a location determination of the wearable device. As such, the user may wear the device during off hours of employment, but critical entity data may not be accessed via the wearable device during those times. Upon indication that the user is at or near the entity location, the system may un-block and allow access to entity data via the user wearable device. As such, the system provides a blockable non-accessible portion in the memory of the wearable device to prevent access to critical entity data while away from an entity location. The access locations for each wearable device may be programmed to allow for one or more accessing points for the data for users that travel, work from home, or have other alternative working patterns.

As illustrated in block 106, the process 100 continues by deploying the entity information specific to the user upon identification of the user. In this way, each user may be deployed different information or entity data based on the user's employment obligations. Finally, as illustrate in block 108, the system may identify the user being off duty or off location and block access to the entity information on the wearable device upon identification of the user being off location or off duty.

FIG. 4 illustrates a high level process flow illustrating operational management via wearable device within an entity 500, in accordance with one embodiment of the present invention. As illustrated in block 502, the process 500 is initiated by identifying a location of the wearable device for each user. The system may identify that the wearable device is being worn by the user and the geographical location of the wearable device based on accessing wearable device systems further illustrated below in FIG. 5.

Upon indication of the location of the wearable device for each user, the system may identify users as the entire the entity location based on the identified location of the wearable device in combination with beacon signaling. As such, the system identifies when the user may have entered a location associated with the entity.

Once the user have been identified within the entity, the system may continually monitor the user location within the entity for timekeeping, as illustrated in block 506. As such, if the user is an hourly employee or otherwise required to clock into a location for employment, the system automatically identifies the user at that location via recognition of the wearable device being worn by the user at that location. The system generates a time stamp for the time the user is identified at the location so that the user does not have to check or log into the location. The system may then generate a log of the user for timekeeping or accounting purposes.

The system may continually monitor the users and the entity location, such as a branch location or the like. The entity location may also include a warehouse, physical store front, digital location, call in center, or the like. The system may monitor those locations and identify the users at those locations. If a user is not at the location, otherwise engaged in another activity, or the like, the system may identify if there is a coverage issue at the entity and/or if a customer needs one or more specialists for customer needs.

As such, as illustrated in block 508, the process 500 continues by identifying if a coverage issue is occurring at the entity and identify if a backup or specialist is needed at the entity. This way, the system may be able to identify a backup user or specialist necessary for a task that is available based on location of his/her wearable device. Once the system identifies the backup or specialist, the system may monitor the backup or specialist to identify the potential availability of the backup or specialist. Upon identification of a backup or specialist that is not predisposed, the system may transmit a request to the backup or specialist user via the wearable device associated with that backup or specialist, as illustrated in block 510. The request may identify a customer and/or location for the user to go to in order to assist.

FIG. 5 provides a process map illustrating position data gathering via wearable device 400, in accordance with one embodiment of the present invention. The positioning data is used to determine the current location and current availability of the user. As represented by block 405, recent interaction data may be retrieved from the wearable device, entity back-end systems, customer reviews, a financial institution back-end system, or the like. Such recent interaction data may indicate the recent projects, customer aid, or the like the user has been performing. The data may also include location information from the user's wearable device. Of course, as the period of time since the last interaction occurred increases, the predicted location and specialty identification of the user loses accuracy. Thus, the most recent interaction data is typically used to predict the current location and specialization of the user. In fact, simultaneously to or substantially simultaneously to conducting an interaction, the system may determine the location of the user and the type of interaction performed.

As represented by block 410, the positioning data may include global positioning data. Global positioning data may include any information collected from methods, systems, apparatus, computer programs, and the like involving locating a user's position relative to satellites, fixed locations, beacons, transmitters or the like linked to the wearable device. In some instances, global positioning data may be collected from a GPS device, such as a navigation system associated with the wearable device. In some embodiments the global positioning data will be snapshots of the user's location at different times. For example, a snapshot of the user's location will be collected each time the GPS software, navigation system or application is activated. In some embodiments, the global positioning data singularly or in combination with other data may be used to location the user in real-time via wearable device associated with the user.

As shown in block 420 of FIG. 5, positioning data of the user may include wearable device data. Wearable device data may include information regarding the current location of the user based on GPS and/or other systems associated with the wearable device. For instance, the current location of a wearable device may be dynamically determined from a signal, beacon or other application. In other instances, a wearable device may include software or hardware to locate the position of the mobile device from GPS signals, wireless network locations, and the like. In yet other embodiments, the wearable device data may be data collected and analyzed by the hardware and/or software of the wearable device concerning the surrounding environment.

Referring now to block 430, the positioning and operational data of a user may also be collected from social network data. It will also be understood that "social network" as used herein, generally refers to any social structure made up of individuals (or organizations) which are connected by one or more specific types of interdependency, such as kinship, friendship, common interest, financial exchange, working relationship, dislike, relationships, beliefs, knowledge, prestige, geographic proximity, or the like. The social network may be a web-based social structure or a non-web-based social structure. In some embodiments, the social network may be inferred from financial transaction behavior, mobile device behaviors, or the like. Social network data may indicate a user's recent, present or future location through expressed data. For instance, a user may upload a blog post, comment on a connection's page, send a friend an electronic message, or the like that identifies the user's location or likelihood the user may be on call or accessible for operation if a backup or specialist is necessary for the entity at a given time. Moreover, many already-existing social networks provide users with the ability to "check-in", "flag" or otherwise indicate the user's current location. Accordingly, user positioning data collected from social networking data may consist of such indications.

As shown in block 440, the positioning data of the user may also be collected from authentication and identification that the user is wearing the wearable device. The system may identify that the user is wearing the wearable device based on confirmation of the identity of the wearer such as by biometric authentication of the user. Upon authentication that the user is wearing the wearable device, the system may use wearable device data to determine the location of the user. In addition, and as further described herein, the wearable device may be linked to the entity system to access and unlock specified doors, windows, gateways, or the like when the user is in close proximity to the doors or other locks, use for operational compliance, regulatory compliance, customer consent, and employment obligations for the user.

FIG. 6 provides a process map illustrating authorization access to one or more locations within entity via wearable device 700, in accordance with one embodiment of the present invention. As illustrated in block 702, the process 700 is initiated by identifying a user wearing a wearable device. As illustrated in block 702, the process 700 is initiated by identifying a user wearing a wearable device. In this way, the system identifies that a wearable device is being worn and authenticates that wearable device to a specific user via bio-recognition, beacon identification, or the like. As such, the system identifies a user is wearing a wearable device and authorized that particular user to that device to confirm the user is who she/he identifies to be. Upon identification of the authorized user wearing a wearable device, the system identifies the user level or band within the entity, including the user's access within the entity, as illustrated in block 704. In this way, the system identifies the user's lever within the entity for access to physical locations, electronic or digital locations, or the like. For example, within an entity there may be one or more doors requiring pass cards, passcodes, or the like for entrance. The system may program the wearable device to include the authentication coding necessary to gain access to these locations if the user has authorization to enter those locations. As such, if the system identifies the user and being at a level that authorizes that user to gain access to an office building that requires a card or code access, the system may provide the code to the user's wearable device, which will allow the user access into that location via recognition of the wearable device. As such, the system limits the need for remembering passcodes, passwords, keycards, fobs, or the like. Furthermore, along with location access, the system may authenticate a user into one or more digital locations, such as computers, digital files, or the like. In this way, the system may identify the user's wearable device near a computer or on a computer attempting to access the computer or data stored within the entity servers. Based on the user's level, the system may or may not allow the user to gain access to the computer or data.

Based on the user being at an approved level for access to the location or data the user is requesting access to, as illustrated in block 706, the process 700 continues by authenticating the user for access to the one or more physical or electronic locations at the entity based on the wearable device coding access approval for those locations.

However, as illustrated in block 706, if the system determines that the user's level does not grant the user access to the location or data the user is requesting, the system may deny the user access to the one or more locations based on the wearable device denial of authentication. In this situation, the system does not grant the user authorization for accessing the location desired by the user. Based on the denial, the system may trigger a transmission of request to an appropriate administrator for user access to the location that the user was denied, as illustrated in block 710. This transmission may be triggered and performed directly from the wearable device. In real-time, the system may transmit the request to the wearable device associated with the administrator. The transmission may include the request, information about the user, current authentication of the user, and why the user is attempting to gain access to the location. The system may identify this based on the user wearable device, user calendar (such as meeting scheduled or the like). The administrator may review the request sent to his/her wearable device in real-time and provide an approval or denial to the request.

In some embodiments, the administrator may provided an approval to the request and the user device received authorization codes to gain access to the location, as illustrated in block 712, the user receives approval for the authentication into the location the user was denied based on signal transmitted from the administrator to the user's wearable device.

FIG. 7 provides a process map illustrating consent and compliance via wearable device 600, in accordance with one embodiment of the present invention. As illustrated in block 602, the process 600 is initiated by identifying the user with a customer. The user may be identified by location based on the user's wearable device. The user may be identified with a customer based on wearable device beacon identification or signal co-location with a customer device, such as a mobile phone or the like. The system may monitor the user time with the customer, time away from the customer, and the like associated with the duration of the customer's visit to the entity.

As illustrated in block 604, the process 600 continues by generating a communicable linkage with the entity server, such as a financial institution server to identify the products/services of customer enrollment. The products/services may be products/services that the customer enrolled in or discussed with the user at the time the user was identified with the customer. In this way, the system may log the time and location duration of the user with the customer via the wearable device of the user. The system may monitor a location of the wearable device, any input on the wearable device, signals or cameras from the wearable device, beacon identification on the wearable device, or the like.

The system may match the user as being with the customer when the customer enrolled in one or more products/services at the entity. This is based on an identification of the user's wearable device being co-located near a customer for a duration of time. The system may then review the entity system server to identify if/when a customer enrolled in a product/service. If the time the customer enrolled in the product/service co-locates with the time the user is identified as being with the customer, the user may be coordinated with the customer product/service enrollment and the user may be documented as being associated with the enrollment, as illustrated in block 608. In this way, the system may identify the user as being the trigger of the customer enrollment and provide any sort of benefit the entity may provide to a user for enrollment of the customer in a product/service.

The product/service enrollment may require approval. Upon identification of the product/service enrollment of the customer the manager may approval the product/service enrollment via a wearable device associated with the manager. In some embodiments, this may be done via manager input on his/her wearable device. In some embodiments, this approval may automatically be performed based on a co-localization of the user wearable device, the manager wearable device, and the customer at or near the time of customer enrollment in the product/service.

Finally, as illustrated in block 610, the process 600 is finalized by confirming proper consent and compliance for product/services enrollment based on wearable device. In this way, the system may confirm the user was with the customer for a predetermined amount of time for each product/service that the customer enrolled in. The predetermined amount of time is the amount of time determined appropriate for enrollment into that specific product/service based on the information required for that product/service, the documentation, and the like. For example, a predetermined amount of time to open a checking or savings account may be shorter than the predetermined amount of time for a mortgage. Upon identification of the duration of time the user and manager spent with a customer, via identification of the location for the user and manager being co-located near a customer via wearable devices associated with the user and manager.

FIG. 8 provides a process map illustrating identification of user skill set and deployment of skills via wearable device directive 800, in accordance with one embodiment of the present invention. As illustrated in block 802, the process 800 is initiated by identifying a user wearing a wearable device. Next, as illustrated in block 804, the process 800 continues by monitoring the user experiences and identifying user skills and/or specializations. In this way, the system may monitor the location of the user and identify the tasks the user is performing on a daily, hourly, or weekly basis. In this way, the system generates a set of user experiences and skills based in the user experiences at the entity. The system identifies the various experiences the user performs over a period of time and identify the user skills at the entity and records those experiences.

As illustrated in block 806, the process 800 continues by monitoring customer interactions within the entity. The system may identify customer interactions and products/services that the customer may desire and may be able to predict one or more products/services the user may be interested in and/or the specialization the customer may require. In this way, as illustrated in block 808, the system identifies the customers that require user skills and/or specialization. In this way, the system may identify a customer that is requiring a user with specific skills and/or specializations within the entity. In some embodiments, the customer may provide an indication of the request. In some embodiments, the system may identify or predict the request based on user previous interactions with the entity.

Upon indication of the customer requiring the skills and/or specialization at the entity, the system may match that customer to a specific user based on the set of user experience. As illustrated in block 810, the process 800 continues by transmitting a notification to the specific user via the user's wearable device. The specific user is identified as the user that matches the customer needs or skill set. As such, the user may be specifically tailored to the customer and the customer's needs. Finally, as illustrated in block 812, the process 800 is finalized by displaying the customer location and other customer information on the wearable device of the user for user deployment to the customer. As such, the system knows where the customer is located and what the customer desires based on the information provided to the user via the wearable device.

FIG. 9 provides a process map illustrating regulatory compliance mapping via wearable device 900, in accordance with one embodiment of the present invention. As illustrated in block 902, the process 900 is initiated by identifying the user location via the wearable device. Next, as illustrated in block 904, the process 900 continues by identifying user initiating performance of employment obligation requiring regulatory compliance standards to be performed and documented. In this way, one or more employment obligations may require regulatory compliance standards, such as those employment obligations within a financial institution.

Next, as illustrated in block 906, the process 900 continues by confirming the location of the user being co-located with a manager or other associate as required for regulatory compliance. In this way, upon identification of the user performing a task that requires regulatory compliance, the system triggers review of the user and users around the user to ensure that the task is performed in a regulatory compliant way. As such, the system monitors the location of the user via wearable device to identify that the user is co-located with the manager or other associate and their wearable devices as required for regulatory compliance, such as requiring two or more individuals, for example, to count funds from a vault or the like.

As illustrated in block 908, the process 900 continues by documenting, via the wearable devices, the co-location of the user and a second user and the duration of the co-location. In this way, based on comparison of the location of the wearable devices, the system may identify one or more users next to each other performing a regulatory compliant task. Once documented, the system may store the documentation of the co-localization of the users for regulatory compliance, as illustrated in block 910.

In this way, the system may identify the requirements for the regulation of the various tasks. The system may then confirm that if two or more users are required, that is done and documented via co-location of two or more wearable devices. In some embodiments, the data or location (such as a vault or the like), may not open until there is a co-location of two or more authorized users for performing the regulatory compliance task. In other embodiments, other regulatory requirements may be mandatory for the task. The system may not allow the user to gain access to the location or data to perform the task until the wearable device identifies that the requirements for the regulatory compliance are met prior to allowing access to the location or the data.

FIG. 10 provides a process map illustrating providing internal alerts via a wearable device 1000, in accordance with one embodiment of the present invention. As illustrated in block 1002, the process 1000 is initiated by identifying a location of an alert. In some embodiments, an alert may include an alert about a danger at the entity, such as a natural disaster, misappropriation, or other danger that may be at or near the entity location.

Next, the system may identify the users at the location requiring the alert. Then, as illustrated in block 1004, the process 1000 continues by communicating with the one or more wearable devices associated with the users within that location. As illustrated in block 1006, the system pay present an alert and instructions for the alert to the wearable devices of the users at the location of the alert. The presentation may be an audio, display, or vibration at the wearable devices of the users alerting the users of the alert.

After the event that triggered the alert, the system may ping locations of each of the one or more wearable devices at the location of alert, as illustrated in block 1008. In this way, the system may identify the location of each user after the alert and if the user is safe from the alert. Finally, as illustrated in block 1010, the process 1000 is finalized by confirming the location of the user via the one or more wearable devices at the location.

FIG. 11 provides a process map illustrating performing real-time appointment generation and modification via a wearable device 1100, in accordance with one embodiment of the present invention. As illustrated in block 1102, the process 1100 is initiated by identifying one or more customer appointments for the user at an entity location. As illustrated in block 1104, the process 1100 continues by identifying the customer scheduled for the appointment approaching the entity location. This may be done via beacon, customer device recognition, camera, customer input, customer communication with an associate at the entity, or the like.

Upon identification that the customer is at or near the entity location, the system may ping the user via the user's wearable device a transmission providing an indication to the user that the customer is at the entity location and the location of the customer within the entity location along with customer information in preparation for the appointment, as illustrated in block 1106. As illustrated in block 1108, the user is presented with the customer information for preparation of the appointment via wearable device. The customer information may include a picture of the customer, the reason the customer is at the entity, any documents required for the appointment, recent transactions of the customer, and the like.

In some embodiments, a manager of the entity may desire to communicate with the customer. These customers may be valued customers, regular customers, new customers, or the like. The system may recognize the customer approaching the entity and queue a wearable device of the manager for the one or more identified customer to notify the manager that the customer is approaching or is at the entity, as illustrated in block 1110. In this way, the manager may be able to communicate with the customer as desired.

Finally, as illustrated in block 1112, the process 1100 is completed by providing the ping to alternative users for customer greeting, upon indication that the user or the manager is otherwise deployed. In this way, the customer may be greeted by one or more users at the entity location so that the customer is greeted and isn't waiting for the appointment to be conducted.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for wearable device coding for operational compliance, the system comprising:
   a memory device with computer-readable program code stored thereon;
   a communication device;
   a processing device operatively coupled to the memory device and the communication device, wherein the processing device is configured to execute the computer-readable program code to:
   deploy a wearable device to one or more users associated with an entity;
   identify initiation of performance of employment obligation by the user based on a location of the wearable device and log user time for performance of employment obligation;
   determine a level of authorization of the user wearing the wearable device for controlling access to entity location, wherein entity location is a physical location and code the wearable device for access to the entity location;
   receive request from the wearable device to access an entity location;
   deny user access to entity location based on level of authorization;
   transmit denial of user access to administrator wearable device, where the transmission includes user input via an interactive interface on the wearable device with reasons for request for access to the entity location;
   code, based on administrator approval via administrator wearable device, real-time limited access to the entity location for the user;
   identify a duration of time that the wearable device of the user is within the entity location;
   transmit notification to a wearable device associated with a specialist to notify the specialist to aid the user at the entity location;

identify the user initiating performance of an employment obligation requiring regulatory compliance standards to be performed and documented;

document a co-localization of the wearable device associated with the specialist and the wearable device of the user, wherein documenting is used to confirm regulatory compliance illustrating the user and the specialist co-localized for performing a task requiring regulatory compliance; and block the limited access to the entity location for the user upon identification of the user being off duty.

2. The system of claim 1, further comprising authenticating the user to gain access to one or more entity physical and/or electronic locations based on the wearable device coding.

3. The system of claim 1, wherein determining the level of authorization of the user wearing the wearable device, further comprises identifying the user employment obligations within the entity and authorizing the user to gain access to entity locations and data for completion of the employment obligation.

4. The system of claim 1, further comprising triggering monitoring a location of the user via the wearable device based on danger or natural disaster for identification of user and transmission of assistance to user.

5. The system of claim 1, wherein the wearable device is a passcode device accepted at a point of entry to a location that allows user access to the entity location based on level of authorization of the user.

6. The system of claim 1, wherein identifying initiation of performance of employment obligation based on the location of the wearable device and log user time for employment obligations further comprises identifying a duration of performance of the employment obligation and logging the entire duration of performance for user timekeeping.

7. The system of claim 1, further comprising displaying entity information on the wearable device, wherein the information displayed or accessible to the user via the wearable device is based on a level of authorization the user has within the entity.

8. The system of claim 1, wherein deploying the wearable device to one or more users further comprises deploying an electronic watch with an interactive interface for communication with other wearable devices across the entity, wherein the user is an associate engaged in obligations for the entity.

9. The system of claim 1, further comprising blocking access to entity data on the wearable device upon identification of geolocation of the wearable device off location from entity designated locations.

10. A computer program product for wearable device coding for operational compliance, the computer program product comprising at least one non-transitory computer-readable medium having computer-readable program code portions embodied therein, the computer-readable program code portions comprising:

an executable portion configured for deploying a wearable device to one or more users associated with an entity;

an executable portion configured for identifying initiation of performance of employment obligation by the user based on a location of the wearable device and log user time for performance of employment obligation;

an executable portion configured for determining a level of authorization of the user wearing the wearable device for controlling access to entity location, wherein entity location is a physical location and code the wearable device for access to the entity location;

an executable portion configured for receiving request from the wearable device to access an entity location;

an executable portion configured for denying user access to entity location based on level of authorization;

an executable portion configured for transmitting denial of user access to administrator wearable device, where the transmission includes user input via an interactive interface on the wearable device with reasons for request for access to the entity location;

an executable portion configured for coding, based on administrator approval via administrator wearable device, real-time limited access to the entity location for the user;

an executable portion configured for identifying a duration of time that the wearable device of the user is within the entity location;

an executable portion configured for transmitting notification to a wearable device associated with a specialist to notify the specialist to aid the user at the entity location;

an executable portion configured for identifying the user initiating performance of an employment obligation requiring regulatory compliance standards to be performed and documented;

an executable portion configured for documenting a co-localization of the wearable device associated with the specialist and the wearable device of the user, wherein documenting is used to confirm regulatory compliance illustrating the user and the specialist co-localized for performing a task requiring regulatory compliance; and an executable portion configured for blocking the limited access to the entity location for the user upon identification of the user being off duty.

11. The computer program product of claim 10, further comprising an executable portion configured for authenticating the user to gain access to one or more entity physical and/or electronic locations based on the wearable device coding.

12. The computer program product of claim 10, wherein determining the level of authorization of the user wearing the wearable device, further comprises identifying the user employment obligations within the entity and authorizing the user to gain access to entity locations and data for completion of the employment obligation.

13. The computer program product of claim 10, further comprising an executable portion configured for triggering monitoring a location of the user via the wearable device based on danger or natural disaster for identification of user and transmission of assistance to user.

14. The computer program product of claim 10, wherein identifying initiation of performance of employment obligation based on the location of the wearable device and log user time for employment obligations further comprises identifying a duration of performance of the employment obligation and logging the entire duration of performance for user timekeeping.

15. The computer program product of claim 10, further comprising an executable portion configured for blocking access to entity data on the wearable device upon identification of geolocation of the wearable device off location from entity designated locations.

16. A computer-implemented method for wearable device coding for operational compliance, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

deploying a wearable device to one or more users associated with an entity;

identifying initiation of performance of employment obligation by the user based on a location of the wearable device and log user time for performance of employment obligation;

determining a level of authorization of the user wearing the wearable device for controlling access to entity location, wherein entity location is a physical location and code the wearable device for access to the entity location;

receiving request from the wearable device to access an entity location;

denying user access to entity location based on level of authorization;

transmitting denial of user access to administrator wearable device, where the transmission includes user input via an interactive interface on the wearable device with reasons for request for access to the entity location;

coding, based on administrator approval via administrator wearable device, real-time limited access to the entity location for the user;

identifying a duration of time that the wearable device of the user is within the entity location;

transmitting notification to a wearable device associated with a specialist to notify the specialist to aid the user at the entity location;

identifying the user initiating performance of an employment obligation requiring regulatory compliance standards to be performed and documented;

documenting a co-localization of the wearable device associated with the specialist and the wearable device of the user, wherein documenting is used to confirm regulatory compliance illustrating the user and the specialist co-localized for performing a task requiring regulatory compliance; and blocking the limited access to the entity location for the user upon identification of the user being off duty.

17. The computer-implemented method of claim 16, further comprising authenticating the user to gain access to one or more entity physical and/or electronic locations based on the wearable device coding.

18. The computer-implemented method of claim 16, wherein determining the level of authorization of the user wearing the wearable device, further comprises identifying the user employment obligations within the entity and authorizing the user to gain access to entity locations and data for completion of the employment obligation.

19. The computer-implemented method of claim 16, further comprising triggering monitoring a location of the user via the wearable device based on danger or natural disaster for identification of user and transmission of assistance to user.

20. The computer-implemented method of claim 16, wherein identifying initiation of performance of employment obligation based on the location of the wearable device and log user time for employment obligations further comprises identifying a duration of performance of the employment obligation and logging the entire duration of performance for user timekeeping.

* * * * *